(12) United States Patent
Adekile et al.

(10) Patent No.: US 9,223,889 B2
(45) Date of Patent: Dec. 29, 2015

(54) AGE APPROPRIATE FILTERING

(71) Applicant: International Business Machines Corporation, Armonk, NY (US)

(72) Inventors: Olusegun Adekile, Raleigh, NC (US); Asima Silva, Holden, MA (US); Cesar A. Wong, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/947,964

(22) Filed: Jul. 22, 2013

(65) Prior Publication Data

US 2015/0026172 A1    Jan. 22, 2015

(51) Int. Cl.
*G06F 17/30* (2006.01)

(52) U.S. Cl.
CPC .................................. *G06F 17/3089* (2013.01)

(58) Field of Classification Search
USPC ............ 706/20; 707/732, 754, 783, 722, 723
See application file for complete search history.

(56) References Cited

U.S. PATENT DOCUMENTS

| | | | |
|---|---|---|---|
| 7,548,910 B1 | 6/2009 | Chu et al. | |
| 8,131,763 B2* | 3/2012 | Tuscano et al. | 707/783 |
| 8,412,657 B2* | 4/2013 | Grenier et al. | 706/20 |
| 8,768,782 B1* | 7/2014 | Myslinski | 705/26.1 |
| 8,843,476 B1* | 9/2014 | Zhang | 707/723 |
| 2004/0006621 A1* | 1/2004 | Bellinson et al. | 709/225 |
| 2004/0215741 A1* | 10/2004 | Watson | 709/217 |
| 2009/0254568 A1* | 10/2009 | Vignisson et al. | 707/10 |
| 2011/0282862 A1 | 11/2011 | Loeb et al. | |
| 2012/0014613 A1 | 1/2012 | Naik et al. | |
| 2012/0096514 A1* | 4/2012 | Tuscano et al. | 726/1 |
| 2012/0191716 A1 | 7/2012 | Omoigui | |

OTHER PUBLICATIONS

"Child Safety—Age-Appropriate Tips," Microsoft, downloaded on Mar. 21, 2013, 2 pages.
"K9 Web Protection," Blue Coat Systems, 2010, 2 pages.

* cited by examiner

*Primary Examiner* — Hung T Vy
(74) *Attorney, Agent, or Firm* — VanLeeuwen & VanLeeuwen; David B. Woycechowsky

(57) ABSTRACT

An approach is provided in which a web page management system receives web page content requested by a browser, and parses the web page content according to one or more assessment categories. The web page management system analyzes the parsed web page content and generates content characterization results in response to the analysis. In turn, by comparing the content characterization results to knowledge base entries, the web page management system generates an "age level content ranking" of the web page content and performs an action on the web page content based upon the age level content ranking.

14 Claims, 10 Drawing Sheets

400

| KNOWLEDGE BASE | | |
|---|---|---|
| ASSESSMENT CATEGORY | ASSESSMENT PARAMETERS | AGE LEVEL (Grade) |
| Sentence Structure | L0 Sent. Structure Parameters | L0 (Pre-K) |
| | L1 Sent. Structure Parameters | L1 (K-3) |
| | L2 Sent. Structure Parameters | L2 (4-5) |
| | L3 Sent. Structure Parameters | L3 (6-8) |
| | L4 Sent. Structure Parameters | L4 (9-12) |
| | L5 Sent. Structure Parameters | L5 (>12) |
| Grammatical Complexity | L0 Gram. Complx. Parameters | L0 (PreK) |
| | L1 Gram. Complx. Parameters | L1 (K-3) |
| | L2 Gram. Complx. Parameters | L2 (4-5) |
| | L3 Gram. Complx. Parameters | L3 (6-8) |
| | L4 Gram. Complx. Parameters | L4 (9-12) |
| | L5 Gram. Complx. Parameters | L5 (>12) |
| Image Type | L0 Image Type Parameters | L0 (PreK-4) |
| | L1 Image Type Parameters | L1 (5-7) |
| | L2 Image Type Parameters | L2 (8-12) |
| | L3 Image Type Parameters | L3 (>12) |
| Color Palette | L0 Color Palette Parameters | L0 (PreK-4) |
| | L1 Color Palette Parameters | L1 (5-7) |
| | L2 Color Palette Parameters | L2 (8-12) |
| | L3 Color Palette Parameters | L3 (>12) |

410     420     430

*FIG. 4* ns which operate in a net-

AGE APPROPRIATE FILTERING

BACKGROUND

The present disclosure relates to age appropriate web page content filtering. More particularly, the present disclosure relates to dynamically generating a web page's "age level content ranking" by comparing content characterization results of the web page's content to age-specific knowledge base information. The web page, in turn, is filtered based upon comparing the age level content ranking to user profile data.

Internet child filters are typically based on keywords and are intended to prevent children from visiting websites that could be considered inappropriate. Several techniques are available that provide parental controls for blocking websites. For example, add-on parental control software may monitor applications such as a web browser or Internet chat application, and intervene according to certain criteria (e.g., a match in a database of banned words). Certain words, however, may have multiple meanings based upon the context in which they are used. As such, filtering web page content based upon word analysis alone may not provide age appropriate filtering.

Techniques utilizing a proxy server are also available that involve a web browser sending requests for web content to the proxy server (rather than directly to an intended web server). The proxy server fetches the web page content from the web server on the web browser's behalf and passes the web page content to the browser. The proxy server inspects the data being sent and received and intervenes based upon various criteria relating to the data. However, this technique also suffers from identifying words that have multiple meanings based upon the context in which they are used.

BRIEF SUMMARY

According to one embodiment of the present disclosure, an approach is provided in which a web page management system receives web page content requested by a browser, and parses the web page content according to one or more assessment categories. The web page management system analyzes the parsed web page content and generates content characterization results in response to the analysis. In turn, by comparing the content characterization results to knowledge base entries, the web page management system generates an "age level content ranking" of the web page content and performs an action on the web page content based upon the age level content ranking.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 depicts a diagram of a knowledge base table;

DETAILED DESCRIPTION

Figure 1:
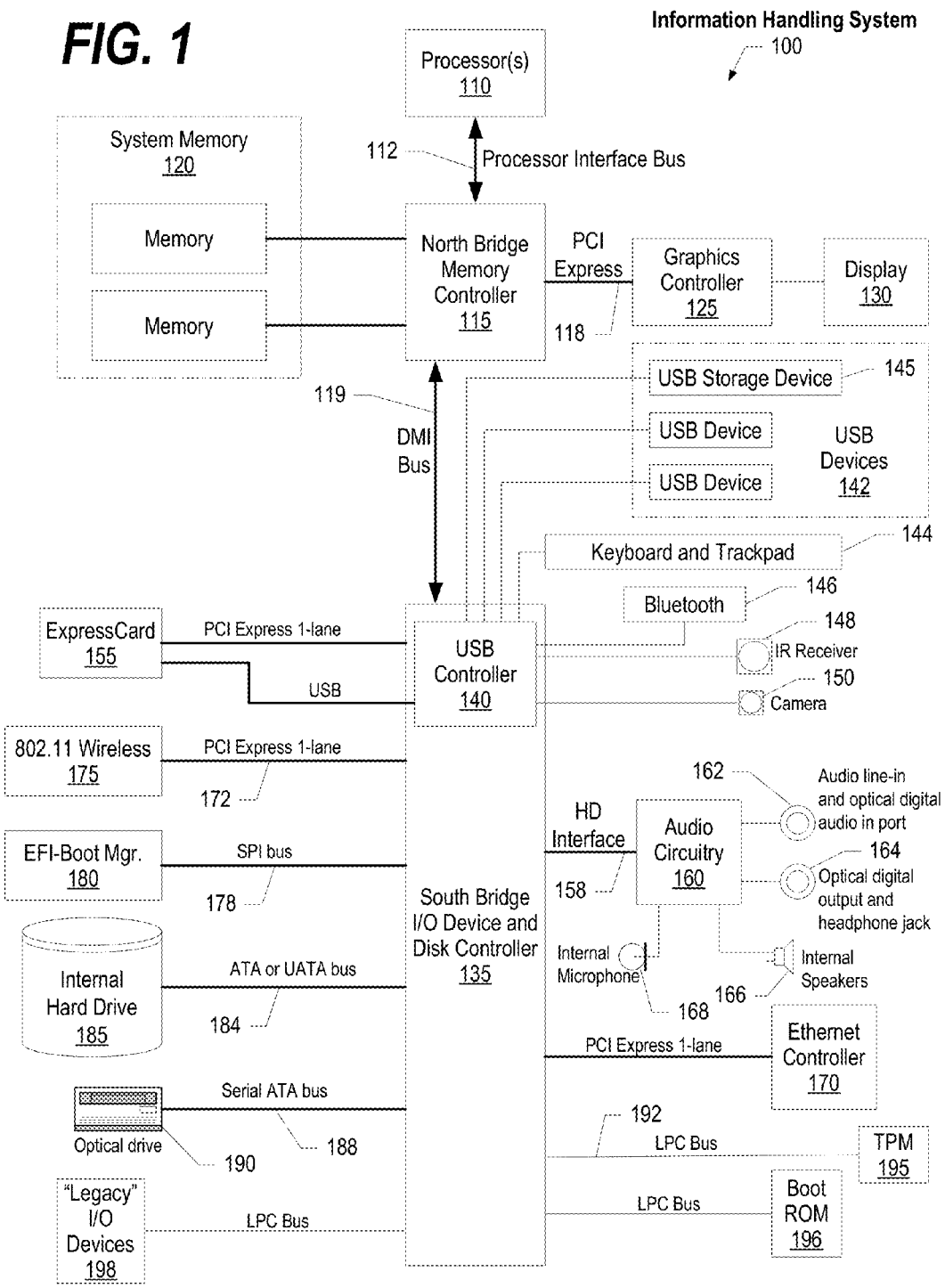
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
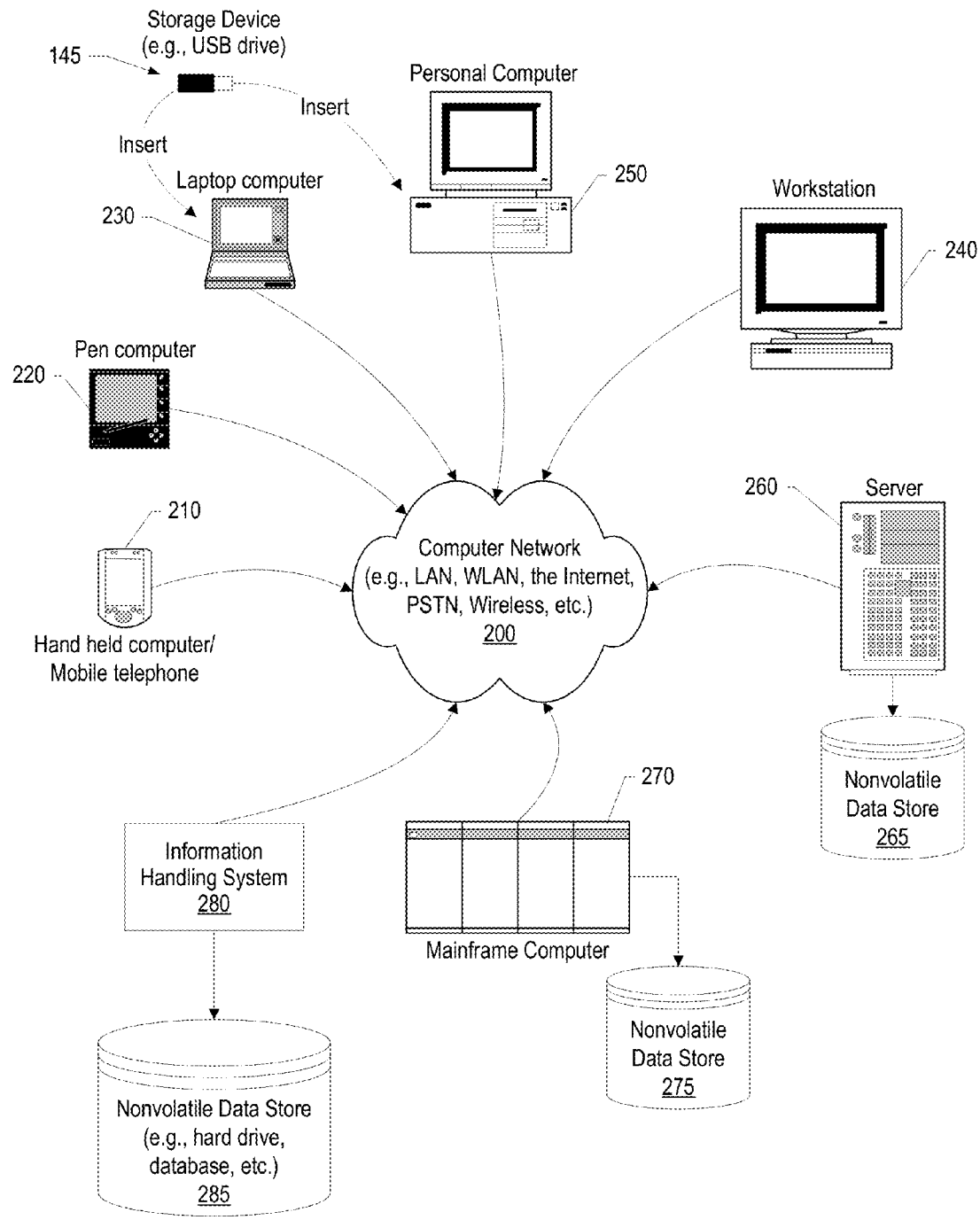
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-10 depict an approach that can be executed on an information handling system, such as a computer system and/or computer network as shown in FIGS. 1-2. A web page management system includes a knowledge base acquisition system, which receives input from experts (e.g., educators, child development professionals, etc.) and generates a knowledge base that includes assessment parameters and corresponding assessed age levels. In one embodiment, the knowledge base acquisition system may utilize artificial intelligence learning methodologies such as neural networks or belief networks, which allows for adaptability in behavior. In this embodiment, inputs by age appropriate categories are provided to the neural network or artificial intelligence system and a knowledge base is built in the form of first-order logic. In this embodiment, inputs may be, for example, digitized educational text books organized by age level.

The web page management system also includes an inference engine that analyzes web page content requested by a user and generates content characterization results based upon the web page content (e.g., sentence structure, grammatical complexities, image types, color palettes, etc.). The web page management system, in turn, compares the content characterization results with assessment parameters included in the knowledge base and generates an age level content ranking of the web page content. The web page management system then determines whether to display the web page content or block the web page content by comparing the age level content ranking with user profile data (e.g., user age, reading level, etc.).

In one embodiment, the web page management system sorts search results based upon the user profile data and age level content rankings of the search results. In this embodiment, the web page management system may display web page links in the top of the search order that correspond to the age level of the user.

Figure 3:
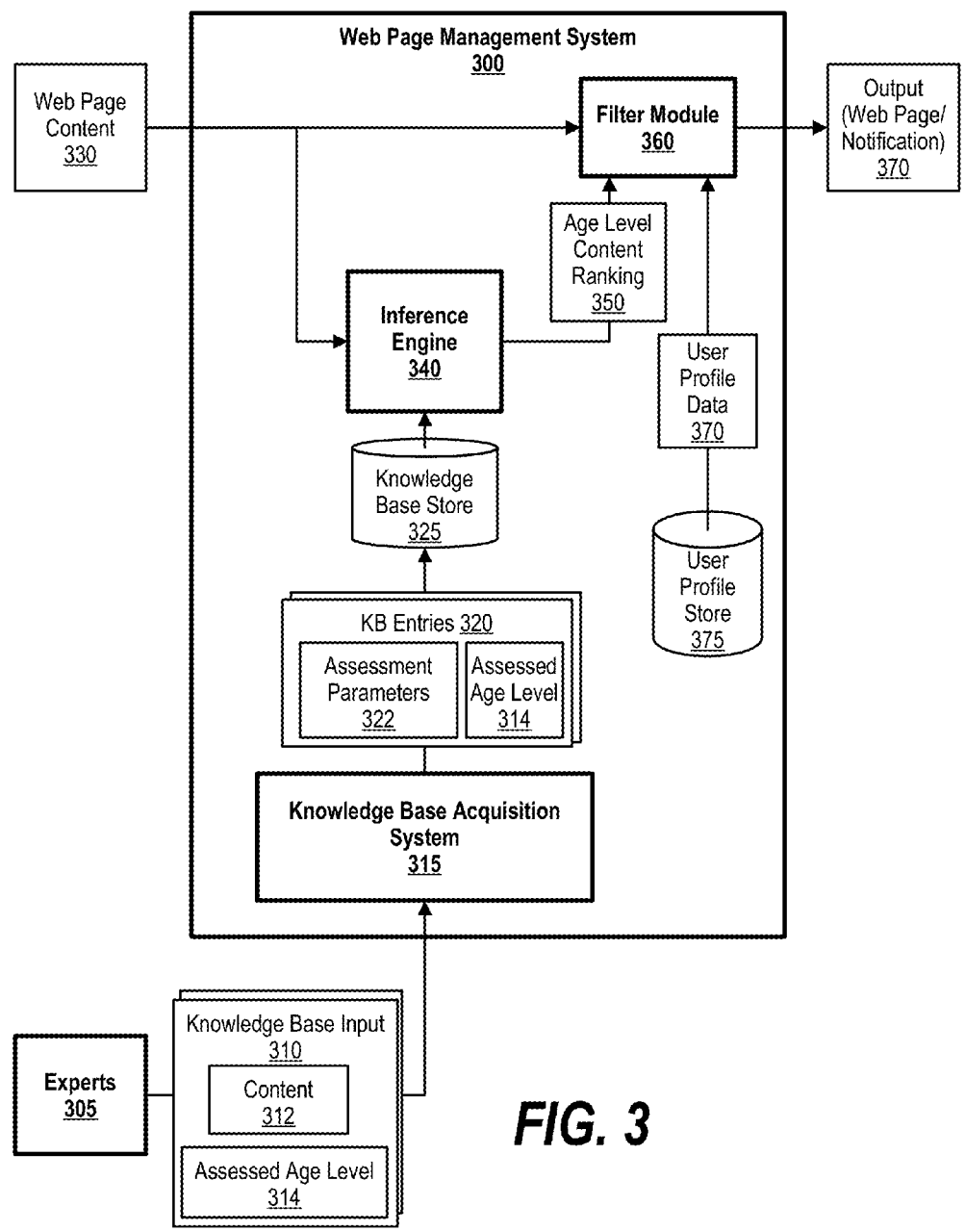
FIG. 3 depicts a diagram of a web page management system that dynamically determines a web page content's age level ranking and filters the web page content accordingly.

FIG. 3 depicts a diagram of a web page management system that dynamically determines a web page content's age level ranking and filters the web page content accordingly. Web page management system 300 includes knowledge base acquisition system 315, which receives knowledge base input 310 from experts 305 (e.g., educators, child behavior experts, etc.). Knowledge base input 310 includes knowledge base content 312 (images, text, etc.,) and assessed age levels 314 corresponding to the knowledge base content (age, grade, etc.). For example, knowledge base content 310 may be grade-level based text book information and assessed age level 314 may include the corresponding grade level and/or a child's age (or range of ages) enrolled in the particular grade.

Knowledge base acquisition system 315 analyzes knowledge base input 310 and generates assessment parameters 322 according to assessment categories such as sentence structures (e.g., number of words, punctuation, etc.), grammatical complexity (e.g., commas, semicolons, etc.), image types (e.g., image content), and color palettes (e.g., black/white, primary colors, etc.). For example, knowledge base acquisition system 315 may use grammatical complexity measurement techniques such as mean length of utterance (MLU) and index of productive syntax (IPSyn) to create grammatical complexity assessment parameters. Knowledge base acquisition system 315 stores knowledge base entries 320, which include assessment parameters 322 and assessed age level 314, in knowledge base store 325 (see FIG. 4 and corresponding text for further details).

Web page management system 300 includes user profile data stored in user profile store 375. The user profile data is provided by users (or a user's parent), which includes information such as the user's age, grade level, and age-based filtering parameters (e.g., reading level, etc., see FIG. 6 and corresponding text for further details).

When web page management system 300 receives web page content 330, which is initiated by a user request (e.g., a web browser), inference engine 340 parses web page content 330 based upon pre-defined assessment categories such as sentence structure, grammatical complexity, image types, and color palette. In turn, inference engine 340 analyzes the parsed web page content and generates content characterization results. As discussed herein, the content characterization results include information corresponding to the characterization of the content. For example, inference engine 340 may determine that sentences, on average, include three to five words with no commas.

Inference engine 340 compares the content characterization results with assessment parameters 322 included in knowledge base entries 320. When a match occurs, inference engine 340 uses the matched knowledge base entries 320's assessed age level 314 to determine a "content category age level" for each assessment category, such as a grammatical complexity category age level of "4" (see FIG. 5 and corresponding text for further details). In one embodiment, inference engine 340 may use a relative ranking system such as "Level 0" for ages 0-5, "Level 1" for ages 6-10, etc.

Inference engine 340, in turn, uses the content category age levels to generate an overall age level content ranking for web page content 330 (age level content ranking 350). In one embodiment, inference engine 340 maps the individual content category age levels to a decision tree to determine the age level content ranking 350. For example, the first branch of the decision tree may be based upon grammatical complexity (e.g., level 0, 1, 2, etc.), and the next branch in the decision tree may be based upon web page content 330's color palette (see FIG. 10 and corresponding text for further details).

Filter module 360 compares age level content ranking 350 with user profile data 370, which corresponds to the user that requested web page content 330 (discussed above). In one embodiment, filter module 360 uses a content level calculated based on the user's profile age, grade, and parameters such as grammatical complexity to compare against the content level ranking 350. Based upon the comparison, filter module 360 provides output 370 that, in one embodiment, is either web page content 330 or a notification that web page content 330 was blocked (see FIG. 8 and corresponding text for further details).

FIG. 4 depicts an example of a knowledge base table generated from knowledge base input received from experts. Knowledge base table 400, which is stored in knowledge base store 325, includes knowledge base entries that each include an assessment category (columns 410), one or more assessment parameters (column 420), and an assessed age level (column 430).

In one embodiment, the assessment categories are pre-defined, which knowledge base acquisition system 315 utilizes to analyze knowledge base input 310. FIG. 4 shows that knowledge base table 400 includes four assessment categories, which are a sentence structure assessment category, a grammatical complexity assessment category, an image type assessment category, and a color palette assessment category. As those skilled in the art can appreciate, more or less assessment categories may be utilized by knowledge base acquisition system 315 than what is shown in table 400.

Assessment parameters, shown in column 420, are created by knowledge base acquisition system 315 in response to analyzing knowledge base input 310. In one embodiment, for example, the sentence structure and grammatical complexity assessment parameters may be as follows:
Level 0: Alphabets in large fonts;
Level 1: Short sentences with short words;
Level 2: Short sentences with more than 4-5 words;
Level 3: Longer sentences (prepositions, adverts, more adjectives) with more than 7-10 words;
Level 4: Longer sentences with more complicated words (SAT level), font size is smaller (8-10) and more sentences in each paragraph; and
Level 5: Longer sentences with more complicated words and pertain to particular subjects.

In another embodiment, the image type and color palette assessment parameters may be as follows:
Level 0 Pre-K: Significant primary color concentration and large pictures;
Level 0 K-4: Primary colors with less concentration of each color, more objects/animals are on the page, primary and secondary colors, and the amount of images on the page is decreased to 25-50% of page;
Level 1: Primary and secondary colors with amount of images on the page decreased to 25-50% of the page;
Level 2 (8-10): More different colors are used with a reduced text/picture ration;
Level 2 (10-12): Less pictures, which are black/white and gray; and
Level 3: Almost no pictures.

Column 430 includes age levels (specified in knowledge base input 310) that correspond to the various assessment parameters included in column 420. As discussed herein, knowledge base acquisition system 315 may assign age levels by age, grade, an age/grade range (shown in FIG. 4), etc. In one embodiment, knowledge base acquisition system 315 may also take other factors into account when assigning age levels such as the type and percentage of colors/images used in on web site relative to the text included on the website. For example, a website for a preschooler versus a kindergartener may be very close in the assessment of the level, but the usage of the percentage of primary colors versus a percentage of pictures to text ratio may differ between the two websites.

Figure 5:
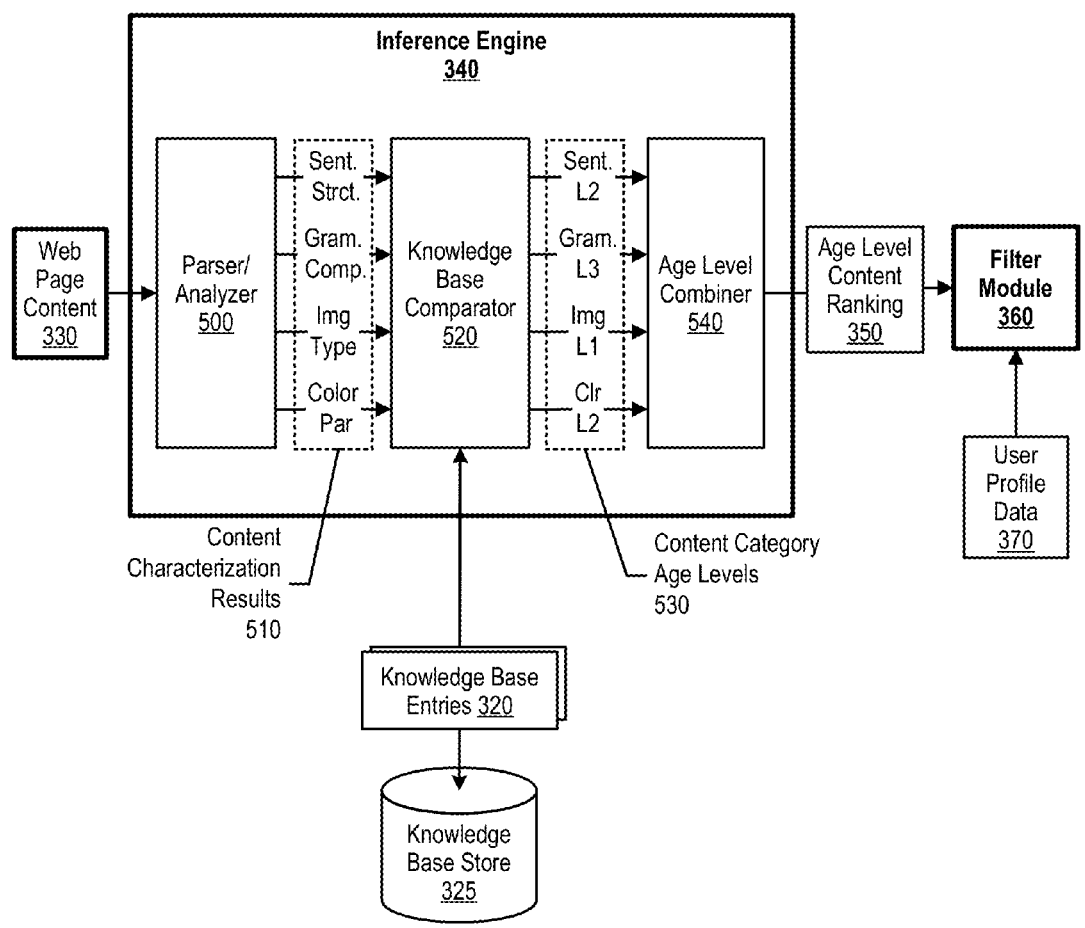
FIG. 5 depicts a diagram of an inference engine that determines an age level content ranking of web page content utilizing a knowledge base that includes age-based assessment information.

FIG. 5 depicts a diagram of an inference engine that determines an age ranking of web page content based upon a knowledge base. Inference engine 340 receives web page content 330 and parses the content using parser/analyzer 500. For example, parser/analyzer 500 may separate text from images, and may also separate the text at a paragraph or sentence level.

Figure 8:
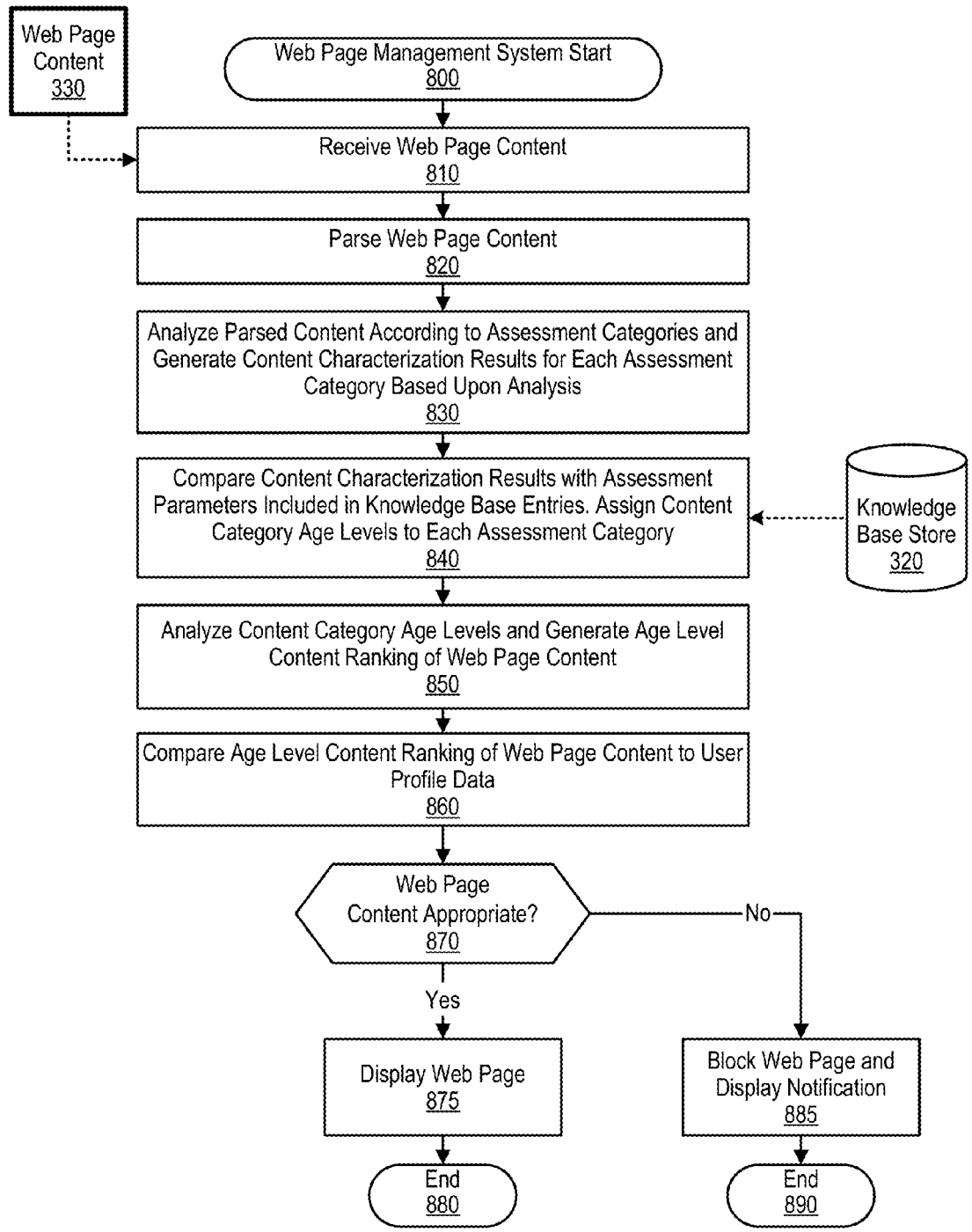
FIG. 8 depicts a flowchart showing steps taken in a web page management system analyzing web page content and filtering the content accordingly.

Parser/analyzer 500 analyzes the parsed web page content based upon assessment categories similar to those utilized by knowledge base acquisition system 315 to generate knowledge base entries 320 (see FIGS. 3, 8, and corresponding text for further details). As such, parser/analyzer 500 generates content characterization results 510 based upon characterization of the parsed web page content. For example, the sentence structure results may indicate that each sentence, on average, includes 3-5 words and no commas; the grammatical complexity results may indicate that, on average, the words are two syllables; the image type results may indicate that the images depict automobiles; and the color palette results may indicate that colors utilized on the web page are primary colors.

Content characterization results 510 feeds into knowledge base comparator 520, which compares content characterization results 510 with assessment parameters included in knowledge base entries 320. For example, knowledge base comparator 520 may compare the sentence structure results with several knowledge base entries' assessment parameters to identify a match. In this example, knowledge base comparator 520 may match the sentence structure result included in content characterization results 510 with a knowledge base entry having the same or closest matching parameters (3-5 words, no commas). In turn, knowledge base comparator 520 retrieves assessed age levels included in the matching knowledge base entries to generate content category age levels 530, which are age levels corresponding to each of the assessment categories.

Age level combiner 540 analyzes each of content category age levels 530 and generates age level content ranking 350. In one embodiment, age level combiner 540 utilizes a decision tree such as that shown in FIG. 10 to determine age level content ranking 350. In turn, filter module 360 compares age level content ranking 350 with user profile data 370 to determine whether to display or block web page content 330.

Figure 6:
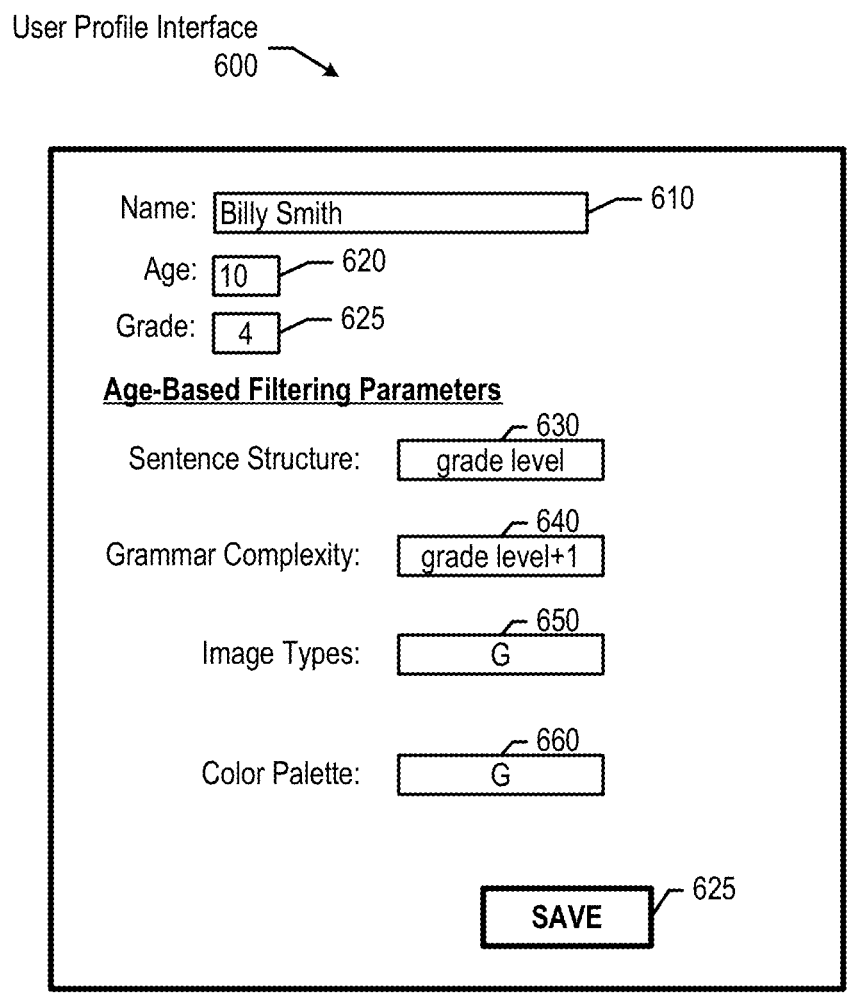
FIG. 6 depicts a user profile interface window that allows a user (or parent) to enter user profile data.

FIG. 6 depicts a user profile interface window that allows a user (or parent) to enter user profile data. Web page management system 340, in one embodiment, provides user profile interface window 600 to a user, which allows the user to enter relevant information in order for web page management system 340 to sort/filter web page content accordingly.

The user enters the user's name, age, and grade in text boxes 610, 620, and 625, respectively. Interface window 600 also includes text boxes 630-640 for the user to enter age-based filtering parameters. The user (or parent) enters an appropriate sentence structure filtering parameter in box 630. In one embodiment the web page management system automatically determines the sentence structure filtering parameters based upon information entered in boxes 620 and 625. In another embodiment, the user may increase or decrease the filtering parameters of a particular assessment category. For example, box 640 shows that the user entered "grade level+1" in box 640 for the grammatical complexity filtering parameter (e.g., the user has an above average vocabulary).

User profile interface 600 allows the user to enter image type filtering parameters in box 650 and color palette filtering parameters in box 660. In one embodiment, these filtering parameters be based upon age levels corresponding to movie rating criteria such as G, PG, PG-13, etc. As those skilled in the art can appreciate, other filtering parameters may be utilized to filter/sort web page content based upon a user's age/maturity level, such as font size, type of font, etc. The user selects save button 625 to save the user profile data in user profile store 375.

Figure 7:
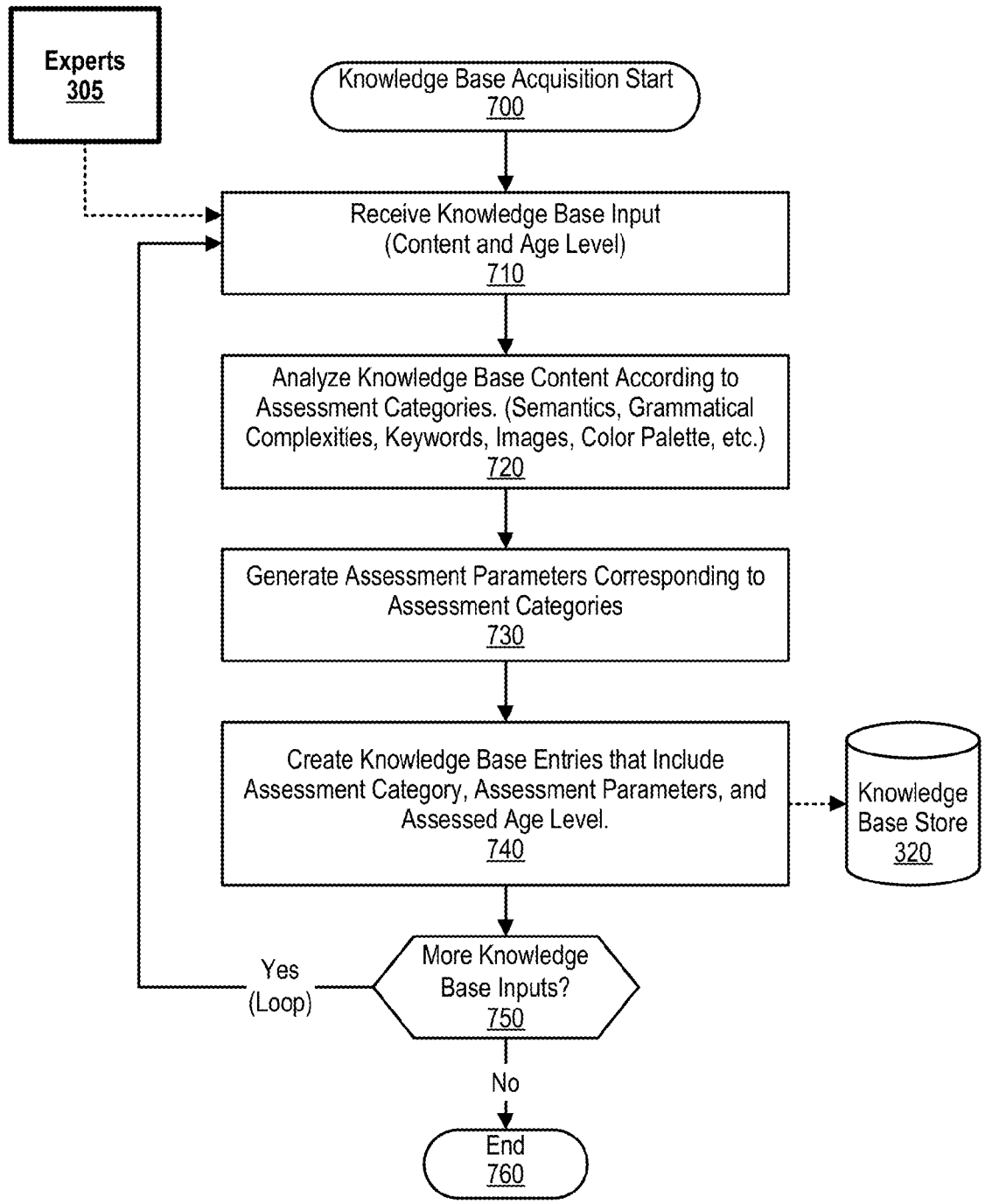
FIG. 7 depicts a flowchart showing steps taken in a knowledge base acquisition process creating knowledge base entries based upon input received from experts.

FIG. 7 depicts a flowchart showing steps taken by a knowledge base acquisition system generating knowledge base entries utilizing input received from experts. In one embodiment, the knowledge base acquisition system's process is based on an artificial intelligence learning methodology, such as neural or belief networks, which allows for adaptability in behavior. In this embodiment, the knowledge base input may be in the form of age appropriate content (e.g., age level digitized educational text books), which are fed to the neural network or artificial intelligence system.

Knowledge base processing commences at 700, whereupon the knowledge base process receives knowledge base input from experts 305 at step 710. In one embodiment, the knowledge base input includes knowledge base content (e.g., document, picture, etc.) and an assessed age level of the knowledge base content, which is determined by experts 305.

The knowledge base process analyzes the knowledge base content based upon assessment categories at step 720. In one embodiment, the assessment categories include a sentence structure category, a grammar complexity category, an image type category, and a color palette category. At step 730, the knowledge base process generates assessment parameters for the assessment categories based upon the analysis in step 720. For example, the knowledge base process may determine a sentence structure pattern in the knowledge base content such that a majority of the sentences include ten-fifteen words and at least one comma. In this example, the knowledge base process generates a sentence structure parameter of "10-15 words, >1 comma."

The knowledge base process, at step 740, creates and stores knowledge base entries in knowledge base store 320 that include an assessment category, the assessment parameters, and an assessed age level (provided by experts 305). Continuing with the example above, the knowledge base process generates a knowledge base entry that includes an assessment category of "Sentence Structure"; assessment parameters of "10-15 words, >1 comma"; and an assessed age level of "15", "Grade 11," or "high school" based upon how refined the knowledge base acquisition system is instructed to indicate age levels.

A determination is made as to whether experts 305 provide more knowledge base input (decision 750). If experts 305 provide more input, decision 750 branches to the "Yes" branch, whereupon decision 750 branches to the "Yes" branch, whereupon the knowledge base process loops back to receive an analyze more knowledge base input. This looping continues until experts 305 are finished providing knowledge base input, at which point decision 750 branches to the "No" branch, whereupon the knowledge base process ends at 760.

FIG. 8 depicts a flowchart showing steps taken by a web page management system analyzing web page content and determining an age level of the web page content. Web page management processing commences at 800, whereupon the web page management process receives web page content 330 at step 810, such as content acquired by a browser. The web page management process parses web page content 330 at step 820, such as separating images from text, and separating text into paragraphs and/or sentences.

At step 830, the web page management process characterizes the parsed web page content based upon particular assessment categories and generates content characterization results corresponding to the assessment categories. In one embodiment, the assessment categories include a sentence structure category, a grammatical complexity category, an image type category, and a color palette category. In another embodiment, the web page management system may use grammatical complexity measurement techniques during the characterization, such as mean length of utterance (MLU) and index of productive syntax (IPSyn) to generate grammatical complexity results.

For each assessment category, the web page management process compares the content characterization results with the knowledge base entries included in knowledge base store 320 (step 840). For example, the web page management process may determine that a majority of sentences in the web page content include between 3-5 words with little to no commas. In this example, the web page management process identifies a knowledge base entry corresponding to the sentence structure category that has assessment parameters that match, or are similar to, 3-5 words with little to no commas. In turn, the web page management process assigns a content category age level to each content category. For example, the web page management process may assign an "L4" to the sentence structure category; an "L3" to the sentence structure category; a "G" to the image type category; and a "PG" to the color palette category.

At step 850, the web page management process analyzes the content category age levels and generates an overall age level content ranking of the web page content. Using the example above, the web page management process may generate an age level of "11" based upon the content category age levels of L4, L3, G, and PG.

The web page management process compares the generated age level content ranking with user profile data at step 860, and a determination is made as to whether to display the web page or block the web page (decision 870). If the web page management process should block the web page (e.g., the age ranking is higher than the user's age), decision 870 branches to the "No" branch, whereupon the web page management process blocks the web page content and, in one embodiment, displays a notification (step 885). Processing ends at 890.

On the other hand, if the web page management process should allow viewing of the web page content, decision 870 branches to the "Yes" branch, whereupon the web page management process displays the web page at step 875, and processing ends at 880.

Figure 9:
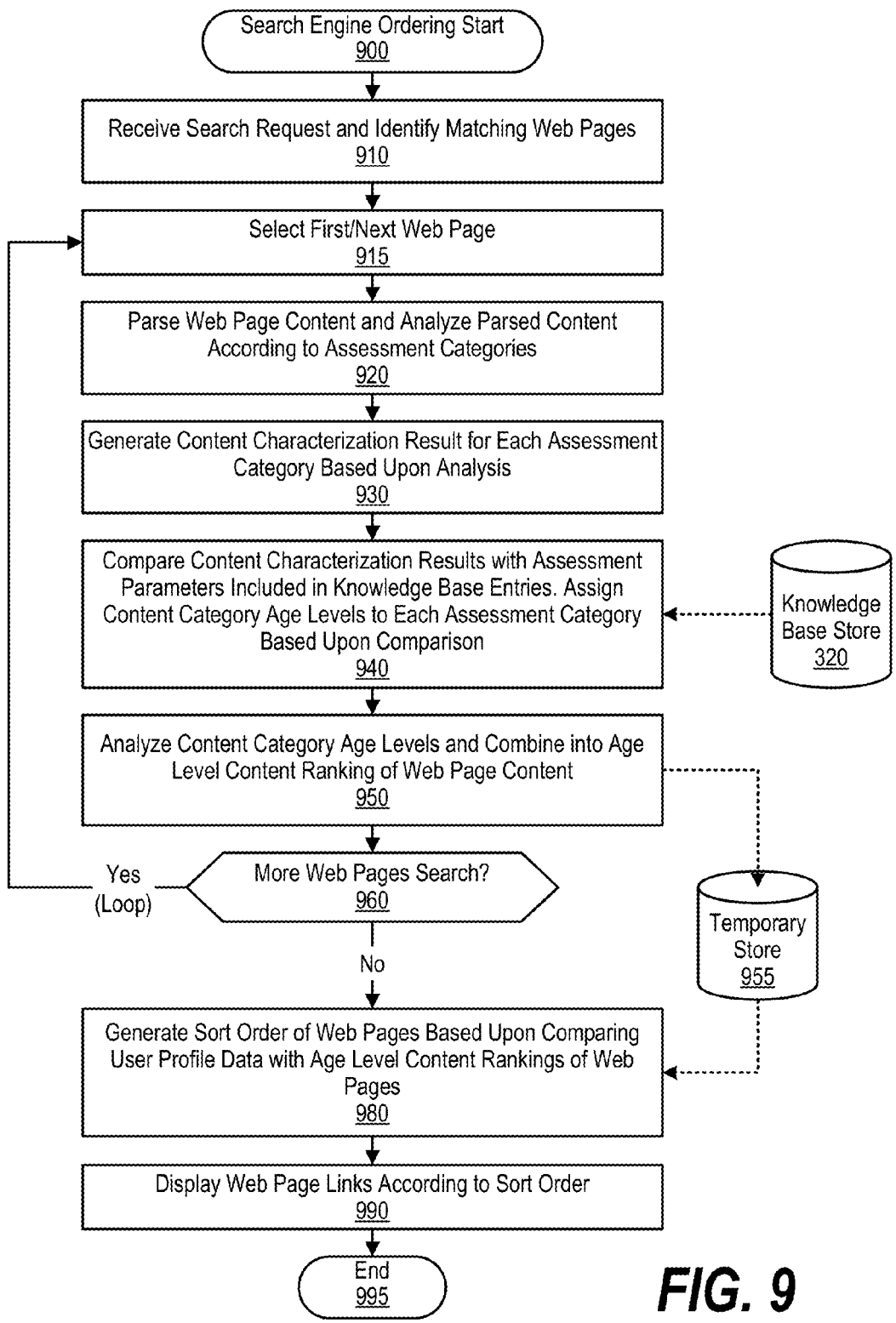
FIG. 9 depicts a flowchart showing steps taken in a web page management system sorting web pages in response to receiving a search report based upon each web page's age level content ranking compared with user profile data.

FIG. 9 depicts a flowchart showing steps taken in a web page management system organizing web page links based upon each web page's age level content ranking compared with user profile data. In one embodiment, the web page management system may be configured to return search results based upon a user's age. In this embodiment, the web page management system generates an age level content ranking for each web page and generates a sort order of the web pages according to the user's age. For example, assuming a user is 15 years old, the web page management system includes web page links towards the top of the sort order that have corresponding age level content rankings of 15.

Web page management processing commences at 900, whereupon the web page management system receives a search request from a user (e.g., from a browser) and identifies potential web pages matching the search request (step 910). The web page management process selects a first one of the web pages at step 915, and proceeds to parse the web page and analyze the parsed web page based upon assessment categories as described herein (step 920). The web page management process generates content characterization results based upon the analysis (step 930), and compares the content characterization results with the knowledge base entries stored in knowledge base store 320 to generate content category age levels for each of the assessment categories (step 940).

In turn, the web page management process analyzes the content category age levels and generates an overall age level content ranking of the selected web page at step 950, which is stored in temporary store 955.

A determination is made as to whether there are more web pages to analyze (decision 960). In one embodiment, a user may configure the web page management system to analyze web pages until the web page management system identifies twenty web pages that have age levels proximate to the user's age. If there are more web pages to analyze, decision 960 branches to the "Yes" branch, whereupon the web page management process analyzes another web page and generates an age level content ranking for the web page accordingly. This looping continues until the web page management has analyzed a sufficient number of web pages, at which point decision 960 branches to the "No" branch.

At step 980, the web page management process generates a sort order of the web pages by comparing the user profile data with the age level content rankings. In one embodiment, the web page management generates the sort order based upon a number of factors, such as the user's age and the relative match of the web page to the search criteria. The web page management process displays links to the web pages according to the sort order at step 990, and the web page management process ends at 995.

Figure 10:
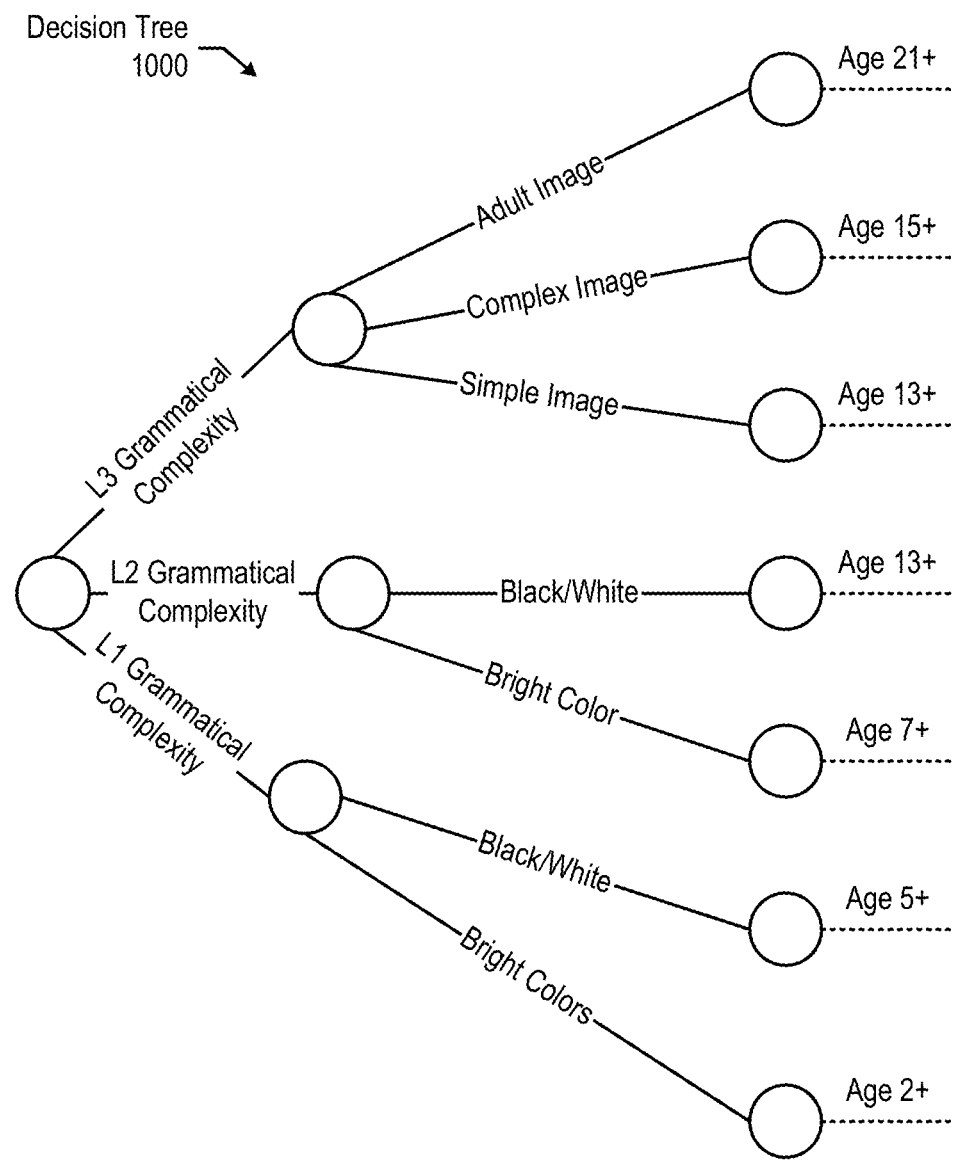
FIG. 10 depicts a diagram of a decision tree utilized by an inference engine to determine a web page contents' overall age level content ranking.

FIG. 10 depicts a diagram of a decision tree utilized by an inference engine to determine a web page contents' overall age level content ranking. In one embodiment, a decision tree is utilized by an inference engine that branches based upon various criteria (grammatical complexity, image types, etc.) to determine an age level of web page content.

Decision tree 1000 graphically exemplifies a branching approach to determine an overall age level content ranking of web page content based upon individually determined content category age levels. Decision tree 1000's first branch decision corresponds to the web page content's determined grammatical complexity age level, which feeds into a second branch that is based upon the web page content's determined image type age level or color palette age level. As those skilled in the art can appreciate, the web page management system may use other approaches to determine the web page content's age level content ranking, such as weighting each categorized age level on an individual basis.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method for age appropriate content filtering, implemented by an information handling system, the method comprising:

receiving web page content requested by a browser;

parsing the web page content according to a plurality of assessment categories;
analyzing the parsed web page content, wherein the analyzing comprises performing semantic analysis on the parsed web page content;
in response to the analyzing, generating a plurality of content characterization results corresponding to the web page content, wherein the generating comprises generating a sentence structure result based on a number of words in one or more sentences present in the web page content, and a grammatical complexity result based on a length of one or more words present in the web page content, the sentence structure result and the grammatical complexity result included in the plurality of content characterization results;
comparing the plurality of content characterization results to a plurality of knowledge base entries, the comparison resulting in an age level content ranking; and
performing an action on the web page content based upon the age level content ranking.

2. The method of claim 1 wherein the comparing further comprises:
identifying one of the plurality of knowledge base entries that includes one or more assessment parameters corresponding to one of the plurality of content characterization results;
retrieving an assessed age level from the identified knowledge base entry; and
generating the age level content ranking based upon the assessed age level.

3. The method of claim 2 wherein, prior to receiving the web page content, the method further comprises:
receiving knowledge base input that includes a plurality of knowledge base content and a plurality of assessed age levels, the assessed age level included in the plurality of assessed age levels;
analyzing the plurality of knowledge base content according to a plurality of assessment categories;
generating a plurality of assessment parameters based upon the analysis of the plurality of knowledge base content, the one or more assessment parameters included in the plurality of assessment parameters; and
creating the plurality of knowledge base entries based upon the plurality of assessment categories, the plurality of assessment parameters, and the plurality of assessed age levels.

4. The method of claim 3 wherein at least one of the plurality of assessment categories is selected from the group consisting of a sentence structure assessment category, a grammatical complexity assessment category, an image type assessment category, and a color palette assessment category.

5. The method of claim 1 further comprising:
comparing the age level content ranking with user profile data corresponding to a user that requested the web page content; and
blocking the web page content from being displayed to the user based upon the comparison.

6. An information handling system comprising:
one or more processors;
a memory coupled to at least one of the processors;
a set of computer program instructions stored in the memory and executed by at least one of the processors in order to perform actions of:
receiving web page content requested by a browser;
parsing the web page content according to a plurality of assessment categories;
analyzing the parsed web page content, wherein the analyzing comprises performing semantic analysis on the parsed web page content;
in response to the analyzing, generating a plurality of content characterization results corresponding to the web page content, wherein the generating comprises generating a sentence structure result based on a number of words in one or more sentences present in the web page content, and a grammatical complexity result based on a length of one or more words present in the web page content, the sentence structure result and the grammatical complexity result included in the plurality of content characterization results;
comparing the plurality of content characterization results to a plurality of knowledge base entries, the comparison resulting in an age level content ranking; and
performing an action on the web page content based upon the age level content ranking.

7. The information handling system of claim 6 wherein the processors perform additional actions comprising:
identifying one of the plurality of knowledge base entries that includes one or more assessment parameters corresponding to one of the plurality of content characterization results;
retrieving an assessed age level from the identified knowledge base entry; and
generating the age level content ranking based upon the assessed age level.

8. The information handling system of claim 7 wherein, prior to receiving the web page content, the processors perform additional actions comprising:
receiving knowledge base input that includes a plurality of knowledge base content and a plurality of assessed age levels, the assessed age level included in the plurality of assessed age levels;
analyzing the plurality of knowledge base content according to a plurality of assessment categories;
generating a plurality of assessment parameters based upon the analysis of the plurality of knowledge base content, the one or more assessment parameters included in the plurality of assessment parameters; and
creating the plurality of knowledge base entries based upon the plurality of assessment categories, the plurality of assessment parameters, and the plurality of assessed age levels.

9. The information handling system of claim 8 wherein at least one of the plurality of assessment categories is selected from the group consisting of a sentence structure assessment category, a grammatical complexity assessment category, an image type assessment category, and a color palette assessment category.

10. The information handling system of claim 6 wherein the processors perform additional actions comprising:
comparing the age level content ranking with user profile data corresponding to a user that requested the web page content; and
blocking the web page content from being displayed to the user based upon the comparison.

11. A computer program product stored in a non-transitory computer readable storage medium, comprising computer program code that, when executed by an information handling system, causes the information handling system to perform actions comprising:
receiving web page content requested by a browser;
parsing the web page content according to a plurality of assessment categories;

analyzing the parsed web page content, wherein the analyzing comprises performing semantic analysis on the parsed web page content;

in response to the analyzing, generating a plurality of content characterization results corresponding to the web page content, wherein the generating comprises generating a sentence structure result based on a number of words in one or more sentences present in the web page content, and a grammatical complexity result based on a length of one or more words present in the web page content, the sentence structure result and the grammatical complexity result included in the plurality of content characterization results;

comparing the plurality of content characterization results to a plurality of knowledge base entries, the comparison resulting in an age level content ranking; and performing an action on the web page content based upon the age level content ranking.

12. The computer program product of claim 11 wherein the information handling system performs further actions comprising:

identifying one of the plurality of knowledge base entries that includes one or more assessment parameters corresponding to one of the plurality of content characterization results;

retrieving an assessed age level from the identified knowledge base entry; and generating the age level content ranking based upon the assessed age level.

13. The computer program product of claim 12 wherein, prior to receiving the web page content, the information handling system performs further actions comprising:

receiving knowledge base input that includes a plurality of knowledge base content and a plurality of assessed age levels, the assessed age level included in the plurality of assessed age levels;

analyzing the plurality of knowledge base content according to a plurality of assessment categories;

generating a plurality of assessment parameters based upon the analysis of the plurality of knowledge base content, the one or more assessment parameters included in the plurality of assessment parameters; and creating the plurality of knowledge base entries based upon the plurality of assessment categories, the plurality of assessment parameters, and the plurality of assessed age levels.

14. The computer program product of claim 13 wherein at least one of the plurality of assessment categories is selected from the group consisting of a sentence structure assessment category, a grammatical complexity assessment category, an image type assessment category, and a color palette assessment category.

* * * * *